Nov. 16, 1965  G. L. CLAPPER  3,218,483
MULTIMODE TRANSISTOR CIRCUITS
Original Filed Oct. 6, 1958  8 Sheets-Sheet 1

INVENTOR
GENUNG L. CLAPPER

BY  *G. R. Gugger*
AGENT

G. L. CLAPPER 3,218,483

MULTIMODE TRANSISTOR CIRCUITS

Original Filed Oct. 6, 1958

United States Patent Office 3,218,483
Patented Nov. 16, 1965

3,218,483
MULTIMODE TRANSISTOR CIRCUITS
Genung L. Clapper, Vestal, N.Y., assignor to International Business Machines Corporation, New York, N.Y., a corporation of New York
Continuation of abandoned application Ser. No. 765,601, Oct. 6, 1958. This application May 29, 1964, Ser. No. 372,141
9 Claims. (Cl. 307—88.5)

This invention relates to transistor circuits and more particularly to transistor circuit building blocks which will provide outputs in three modes or voltage ranges.

This application is a continuation-in-whole of our application Serial No. 765,601 filed October 6, 1958, now abandoned.

The development of transistor circuitry has been characterized by the adherence to certain specific modes of operation. Attempts at using any one mode or voltage range in an "across the board" manner have often resulted in costly compromise and belated special circuit development. Recognizing a need for greater flexibility, the present invention provides a multimode approach to transistor circuit design. Various modes of operation have been analyzed for salient advantages and circuitry developed using the best features of each mode. Similarly, the disadvantages of each mode have been noted so that pitfalls inherent to each mode of operation are avoided. The resultant circuitry is simple in concept, straightforward in design, and tolerant of parameter variations. A minimum of power supplies are used consistent with marginal checking requirements.

There are in use at present a number of modes of operation having the following signal amplitude ranges:

| Range of signal amplitude | Mode of operation: |
|---|---|
| Small signal (Class A) | 0.03 volts to 0.3 volts. |
| Current switching | 0.3 volts to 3.0 volts. |
| Voltage modes | 3.0 volts to 30 volts. |
| Range limited by device | 30 volts and higher. |

In carrying out the principles of the present invention, the small signal (Class A) range and the device limited range (above 30 volts) will be excluded and the signal ranges somewhat narrowed as follows:

| Range of signal amplitude | Mode of operation: |
|---|---|
| Current Mode | 1.0 to 3.0 volts. |
| Voltage Mode | 3.0 to 6.0 volts. |
| Passive Logic Mode | 6.0 to 12.0 volts. |

The current mode of operation has significant advantages. When transistors, such as the surface barrier or graded base (drift) transistors are used, very high speed logical devices are possible. The operation of large portions of certain high speed computers at a frequency up to ten megacycles is made possible by using the current mode. When the alloy junction transistor is utilized as the active device, the delays encountered in logical devices restrict the operation to less than one megacycle.

A major advantage of the current mode is found in the range of signal levels. Since the energy stored in the capacitance of a transmission line, for example, is proportional to the square of the voltage, it is apparent that much less power will be used to drive a line with a one volt than with a ten volt signal. It is also possible to properly terminate the line in its characteristic impedance and develop a small voltage swing without exceeding the current handling capabilities of the transistor.

Alloy junction current switching logic circuits have been proposed as a standard for the intermediate frequency range to reduce cost. It has been pointed out that the alloy junction transistor does not perform as well as the surface barrier or drift transistors, and this is fundamental to the device because the carriers must cross a relatively wide base region by diffusion. Because of this diffusion, alloy junction current switching logical circuits are not superior in speed to properly designed voltage mode circuits using either active (transistor) or passive (diode) logic, or a combination of these. Using current mode, the transistor count is much higher, however, which means increased costs.

More serious disadvantages of the current mode are that it is not well suited to a large class of necessary devices such as triggers, shift registers, core drivers, differentiators, etc., and the current mode is more susceptible to noise than the voltage mode circuits as a class.

Considering the voltage mode, the class of necessary devices mentioned above is well suited to the voltage mode of operation. Although such devices may be considered to be a small part of the largest computers, they are a very significant part of the small or medium-sized computer. A device such as a timing ring or shift register may be built very reliably and economically with voltage mode circuitry. Another advantage of the voltage mode is the ease of translation to either a lower signal level or to a higher amplitude of signal level. The reduction of level may be simply accomplished by a resistive divided. An increased signal is provided by an amplifier-driver such as the grounded emitter (inverter) or the grounded base (paraphrase amplifier). The use of the emitter follower is feasible in the 3 to 6 volt range for driving purposes and the complemented emitter follower or complemented inverter may also be used in special cases.

There are several disadvantages of the voltage mode when this mode of operation is employed "across the board" with the circuits presently in use. Most of these are transistorized vacuum tube circuits which do not take advantage of many of the unique characteristics of the transistor. One disadvantage is associated with the input divided commonly used. The design is costly in terms of component space and design effort. Further, the ubiquitous bypass capacitor is a problem from the standpoint of the transmission of noise pulses into the base of the transistor.

Another problem is associated with cascaded logic. Using signal levels of five volts or less will permit practically no cascading, and a six volt signal allows limited cascading. A further disadvantage is the problem of stable voltage supplies. Noise may be injected through the common emitter connection if the voltages are not well filtered and if filtering is used, the noise may be transferred to the ground plane, where it can also be troublesome. A still further disadvantage is associated with the driving of stray capacity. As noted previously, the energy stored is proportional to the voltage squared and more power must be used to drive capacity and preserve the waveform rise and fall times. The transient charging currents will likewise be high, thus increasing the noise problem and filtering requirement. In order to drive long lines at a five or six volt signal level, power drivers must be used. Drivers employing complementary symmetry may be used but protective measures must be taken to prevent damage.

The use of higher voltage swings has several obvious advantages which have made the passive logic (6 to 12 volts) mode of operation appear very desirable. The chief advantage of this mode of operation is in regard to diode logic. The use of a ten or twelve volt signal allows much greater cascading and cheaper diodes may be used since the forward voltage drop need not be so carefully controlled. The resulting circuits may be very economical to build if logical circuits are a large part of the computer. And, in general, there is a greater tolerance to noise with the increased voltage swing.

Although the advantages are significant, the disadvantages of the passive logic mode for use "across the board" are substantial. A troublesome factor, as in the voltage mode, is the bypass capacitor. If cascading of passive logic is employed, level shifts known as "logic noise" appears in the signal. The transient may be coupled through the divider bypass capacitor. Line drive is a more serious problem than with lower voltage swings as, for example, the energy on the stray capacitance of a ten volt system is one hundred times that stored in a one volt signal system. Punch through and transistor breakdown are more likely to occur, especially if high voltage returns are used and the limiting or clamp diodes fail. Because of the limited power handling capabilities of present day devices, the higher voltage signals must be restricted to lower frequency operation if capacitive loads are driven since there is high peak transient power involved.

It is evident from the foregoing that any one system or mode has certain definite advantages. These are not the same for any of the modes that have been considered and, in fact, the advantages of each mode are quite different from the advantages of the other modes. The disadvantages of each system are likewise dissimilar. The disadvantages of each mode are usually associated with certain areas of usage which are not the same as the areas that include the advantages. This, of course, is brought about by the necessity of having to use one mode of operation for all circuit types. For example, the current mode is expensive for slow-medium speed logic, the voltage mode is deficient in the divider design-bypass capacitor area, and the passive logic mode is adversely affected by capacitive loading.

To overcome the above shortcomings in transistor circuit design, it is proposed to use each mode in the area for which it is best suited from the standpoint of reliability, serviceability and economy and, at the same time, avoid all possible areas in which a particular mode is deficient. A system is employed which uses the simplest possible circuit configurations and as few circuit types as possible. Also, voltage levels and supply voltages are compatible with present usage and the input divider and bypass capacitor, now so commonly used, are eliminated.

The present novel system presents a multimode rather than a single mode approach to transistor circuit design and has as its main object the provision of circuits designed such that current mode, voltage mode and passive logic mode signals are each available from a number of basic building blocks. As an example, in the present system, all devices used as information sources, such as triggers, rings, registers, etc., will have three outputs each corresponding to the three modes of operation.

Other objects of the invention will be pointed out in the following description and claims and illustrated in the accompanying drawings, which disclose, by way of example, the principle of the invention and the best mode, which has been contemplated, of applying that principle.

Before describing all of the special multimode circuits that are needed for a computer application, the operational modes and voltages together with the circuits developed to implement them will be described. The three modes of operation are defined as follows:

(1) Current Mode Output
   (a) Reference 0 volts—ground
   (b) Low impedance, about 200 ohms
   (c) Small signal swing, about ±1 volt best fitted for driving line capacity, coax, etc.
(2) Voltage Mode Output
   (a) Output levels 0 volts, 6 volts
   (b) Output impedance about 800 ohms
   (c) Designed to drive medium capacity as in triggers, single shots, rings, etc.
(3) Passive Logic Mode Output
   (a) Reference −6 volts
   (b) Output impedance about 1–3 kilohms
   (c) Large swing designed to drive either resistor or diode logic with maximum safety factor.

In the present multimode system, only four supply voltages are needed. These have definite functions which are the same for all circuits and for this reason separate marginal check supplies will not be needed in most cases. The supply voltages and functions are:

+12 volts—diode logic return
+6 volts—current mode termination
−12 volts—passive logic termination
−6 volts—reference for passive logic mode
0 volts—reference for current mode.

The following circuit configurations are used as the building blocks to make up all of the multimode circuitry, to be described later:

(1) NPN inverter=driver (common emitter)
(2) PNP inverter=amplifier (grounded emitter)
(3) PNP paraphase amplifier (grounded base)
(4) PNP emitter follower (common collector)
(5) NPN emitter follower (common collector)
(6) Diode Logic

*Logical AND circuit with output driver*

Figure 1:
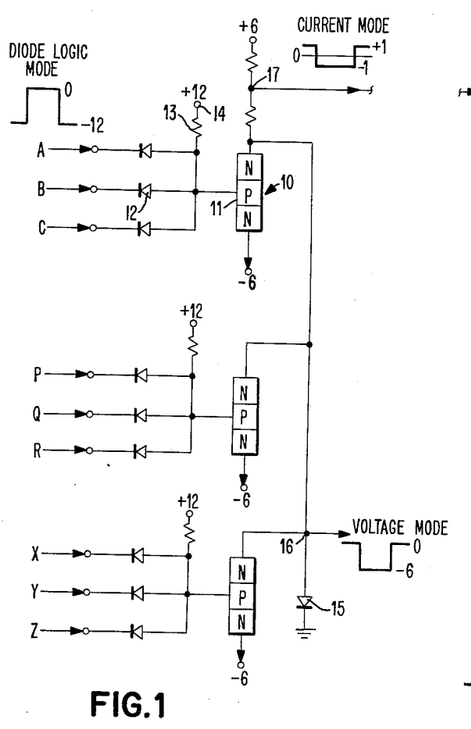
FIG. 1 is a diagram of a logical AND circuit with output driver, representing one of the basic multimode building blocks.

Referring to FIG. 1, there is shown a logical AND circuit with an output driver and this circuit is the basic building block for logic. There is no practical limit to the number of diodes that may be used and a 10-way logical AND does not present any circuit problem. The NPN inverters are operated in parallel for the OR function. The simplicity of the circuit is evident, the equivalent logical function in the current switching mode would require sixteen transistors whereas the circuit in FIG. 1 requires three transistors and nine diodes.

In the operation of the circuit, if any one of the inputs A, B, or C, for example, to an AND circuit is at the "off" level, the NPN inverter 10 is cut off. The "off" level may vary from −12 volts up to about −7 volts with no effect since the PN emitter-base junction is reverse biased. This allows the input level to be variable within this range as a result of variable loading, for example. The leakage current will flow from the base 11 of the transistor through the low impedance of the particular diode 12 that is forward biased and into the low impedance input driver A, B, C. This is a substantial improvement over the resistor input divider with its high impedance path for leakage current.

When all three inputs A, B, C, of the AND circuit are "on," the NPN inverter 10 conducts. The "on" level may be anywhere in the range from −5 volts to 0 volts since the base of the NPN inverter is clamped at −6 volts by the low forward resistance of the PN emitter-base diode. Under these conditions, the input diodes 12 are reversed biased and the input signal level may vary without affecting the conduction of the NPN inverter. The base current is limited by the diode AND resistor 13 returned to the +12 volt terminal 14. A clamp diode 15 is used to limit the voltage mode output at point 16 to 0 volts when all of the NPN inverters are cut off. The current mode output at point 17 is at +1 volt under load condition. When any NPN inverter conducts, the voltage mode output drops to a nominal −6 volts and the current mode output drops to about −1 volt. At the termination of the input coincidence at A, B, C, the NPN inverter 10 is forced off by the low forward impedance of the conducting logic diode 12. This rapidly scavenges the base region P of any excess minority carriers which assures a fast response at the trailing edge of the output waveform. In this way the delays associated with operating the transistor in saturation are minimized. The same principle is applied to the operation of the NPN inverter.

*PNP inverter*

The PNP inverter is used to invert the already inverted current mode signal to the diode logic mode. Thus, functions are transmitted over the lines in the inverse form and are restored to the direct representation by the inverting amplifier.

Figure 2:
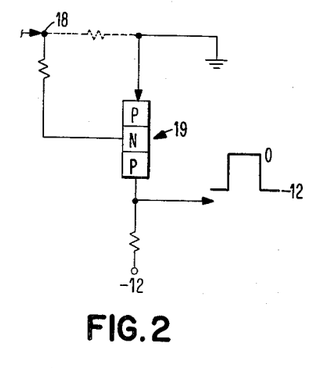
FIG. 2 is a diagram of a PNP inverter for inverting a current mode signal to the logic mode and represents another multimode building block.

Referring to FIG. 2, when the voltage at the input point 18 is above ground, the PNP inverter 19 is cut off and the output voltage is at −12 volts. An information pulse will drop the voltage at the input to about −1 volt, the inverter 19 conducts and the output voltage rises to ground. At the end of the input pulse, the input returns to the normal +1 volt level, the inverter is cut off, and the output returns to −12 volts.

A transmission line may be terminated in its characteristic impedance as indicated. Shorter lines need not be terminated, in which case branching may be employed. Paralleling of drivers may be done, as shown in FIG. 1, for the OR function. This is a very simple line terminator. Not more than three logical ANDS may be driven from the output directly; however, branching units will be described later that will allow as many as fifty logical AND inputs to be driven from the terminating inverter.

Figure 2A:
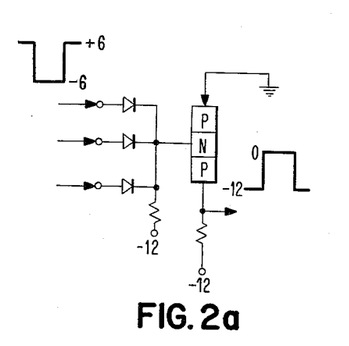
FIG. 2a is a diagram of a logic building block which is the inverse of that shown in FIG. 1.

Another possible logical building block is the inverse of the circuit shown in FIG. 1. As shown in FIG. 2a, a signal level of negative 6 volts to positive 6 volts is required and this may be obtained from the circuit of FIG. 1 by removing the clamp diode 15. Under these conditions, the current mode output would not be used.

The circuit shown in FIG. 2a is a negative AND logical block. A coincidence of negative signals at the inputs will produce a positive output from negative 12 volts to 0 volts.

*PNP paraphase amplifier*

As was previously mentioned, the signal on the current mode output is the inverse logical function. A paraphase voltage amplifier is used to create a voltage mode output or the logic mode output in the inverse form. This gives the NOT or INHIBITED function.

Figure 3:
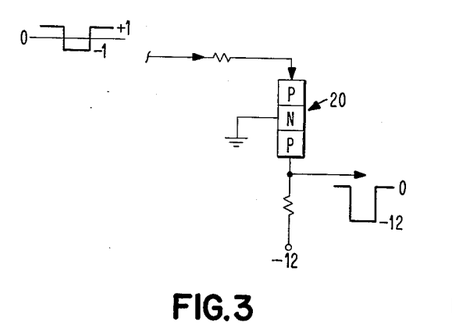
FIG. 3 is a diagram of a PNP paraphase amplifier for producing a voltage mode or logic mode output in the inverse form and represents another multimode building block.

Referring to FIG. 3, with the input at about +1 volt approximately four milliamperes of current flows in the collector circuit of the PNP grounded base voltage amplifier 20 and the output is at 0 volts. A PNP emitter follower should be used with this circuit if branching is desired.

*PNP emitter follower*

The PNP emitter follower is used for branching to the inputs of positive AND circuits. This is an efficient driver in the diode logic mode for negative current (current flow into the driver).

Figure 4:
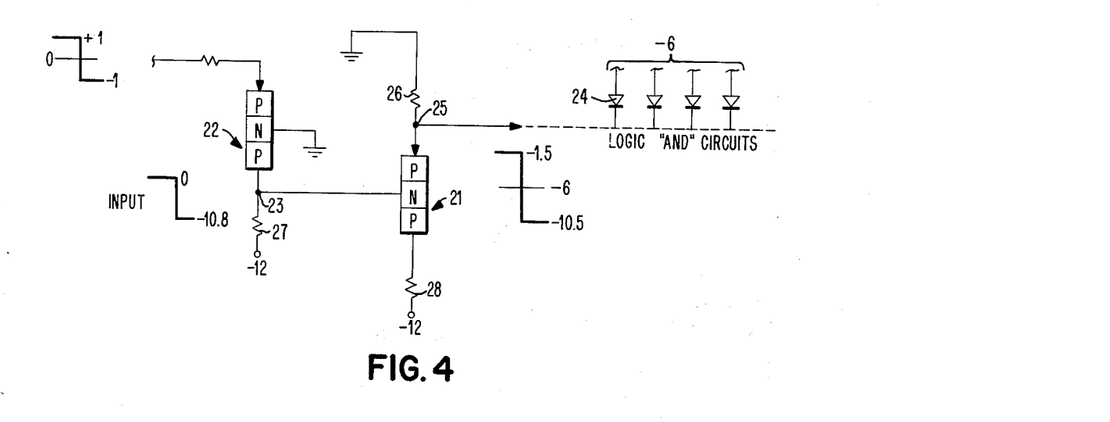
FIG. 4 is a diagram of a PNP emitter follower used for branching to the inputs of positive AND circuits and represents a multimode building block.

Referring to FIG. 4, a PNP emitter follower 21 is used as a branching driver for a PNP paraphase amplifier 22. With the paraphase amplifier output at point 23 at 0 volts, the emitter follower is cut off and any positive current flowing out of the driver will increase the cutoff. The leakage current in the inversely polarized diodes 24 of the logical AND circuits will be about 0.5 milliamperes for ten diodes, in which case, the worst upper output level at point 25 will be −1.5 volts.

When the paraphase amplifier cuts off, the voltage at the base of the PNP emitter follower drops and base current begins to flow. For the maximum load of ten conducting AND diodes 24, the load current will be about 10 milliamperes. Current in the resistor 26 will be about 3.5 milliamperes and the total emitter current will be 13.5 milliamperes. For an end of life transistor, the base current will be 0.4 milliamperes and the collector current about 13.1 milliamperes. The drop in the output resistor 27 of the paraphase voltage amplifier will be 1.2 volts, for the worst case, and this corresponds to a 1.3 voltage drop in the collector resistor 28 of the emitter follower. The worst case lower output level will then be about −10.5 volts and, therefore, the maximum load condition leaves 9 volts available from the logic mode signal which is centered about a reference of −6 volts.

*NPN emitter follower*

Figure 5:
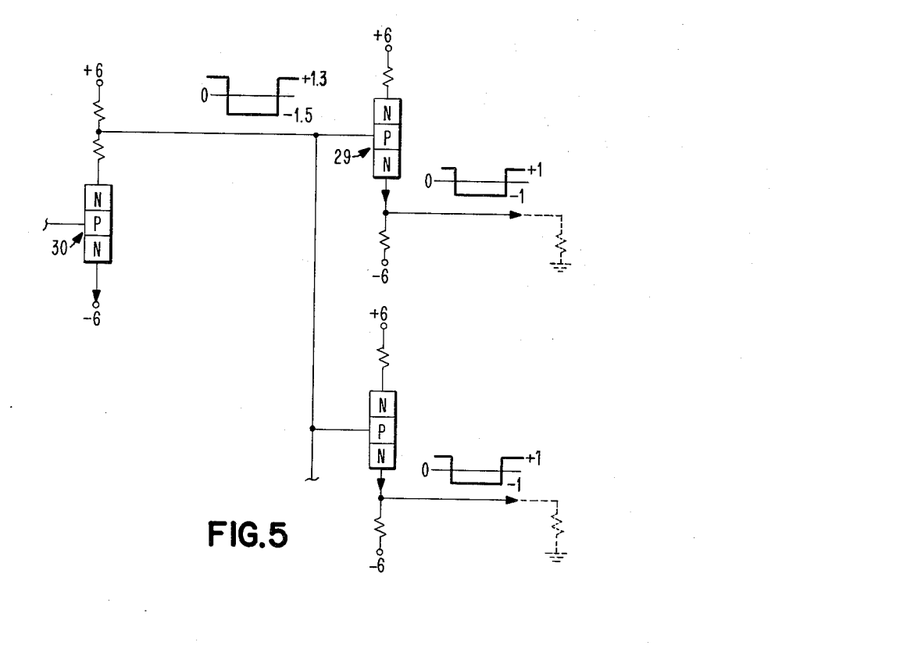
FIG. 5 is a diagram of an NPN emitter follower used wherever there is need for positive current drive and represents a multimode building block.

The NPN emitter follower is used wherever there is need for positive current drive. It may be used to drive passive logic OR circuits in special applications; however, it is preferable in most cases that the active OR logic, shown in FIG. 1, be used. This is especially true when the logic is converging, since the use of passive logic for the OR may increase the drive requirements on many drivers in the initial stages of the logical configuration. The NPN emitter follower may be used most advantageously in combination of line drive and branching operations. As noted previously, the NPN inverter current mode output may be used for limited branching. Where there is need for more power than the divider network will supply, NPN emitter followers are used.

Referring to FIG. 5, the NPN emitter followers 29 act as impedance transformers and allow branching from one NPN inverter 30 to at least ten transmission lines. For the worst case, the levels are +1 volt and −1 volt, centered about a 0 volt reference level. Conversely, instead of transmission lines, up to ten PNP inverting amplifiers may be driven over unterminated lines. Each of these in turn may drive five PNP emitter followers which, in turn, can each drive ten diode inputs. This may be shown in tabular form as follows:

1—NPN inverter drives
    10—NPN emitter followers which drive
    100—PNP inverter amplifiers which drive
    500—PNP emitter followers which drive
    5000—diode AND inputs.

This is a number so large that it is evidently possible to meet all normal branching requirements with the simple units that have been described.

The five elemental "building blocks" described above may be used in combination to create all the special circuits needed in a computer application. In general, the elemental circuit are used with only slight modification and in some cases additional elements such as resistors and capacitors are used as coupling means. The following circuit configurations are shown and will now be briefly described:

| Configuration | Elements used |
| --- | --- |
| Exclusive OR | NPN inverter-driver. PNP inverter amplifier. PNP paraphase amplifier. |
| Binary trigger | 2 NPN inverter-drivers. 2 PNP paraphase amplifiers. |
| Ring trigger | NPN inverter-driver. PNP inverter amplifier. |
| Multivibrator | 2 NPN inverter-drivers. 2 PNP paraphase amplifiers. |
| Single shot | NPN inverter-driver. PNP inverter-amplifier. |
| Pulse stretcher | NPN inverter-driver. PNP inverter-amplifier. |
| Shift register | NPN inverter-driver. PNP inverter-amplifier. PNP paraphase amplifier. |
| Shift register driver | NPN inverter-driver. NPN emitter follower. |
| Full adder | 3 NPN inverter-drivers. PNP inverter-amplifier. |

Exclusive OR

Figure 6:
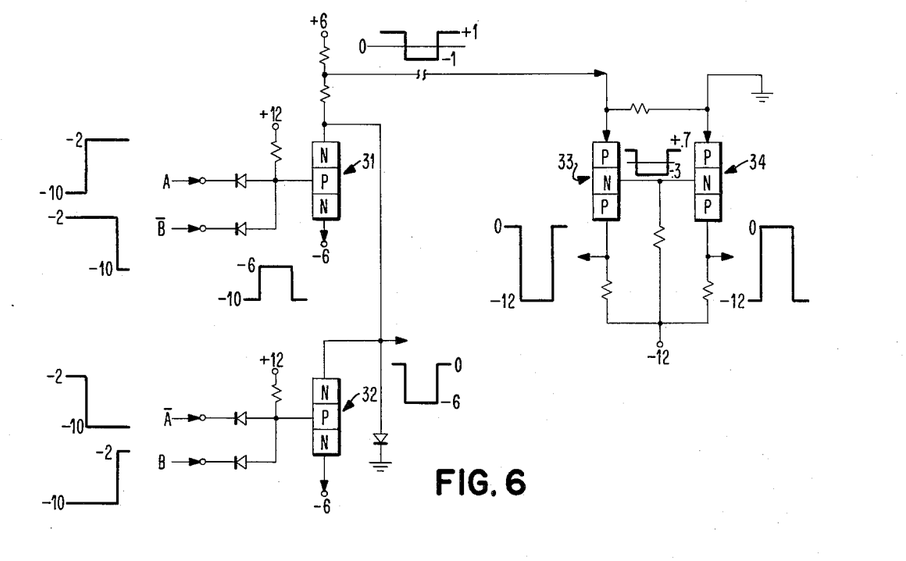
FIG. 6 is a diagram of a multimode exclusive OR circuit.

Referring to FIG. 6, an exclusive OR configuration is shown as an example of one of the additional uses for the basic logical devices. Each function and its inverse A, $\overline{A}$, B and $\overline{B}$ are applied to separate logical AND inputs. An OR function is performed by commoning the NPN inverter drivers 31, 32 and the result is the exclusive OR (either, but not both). The inverse function is the identity function (A identical to B) and this is obtained by amplifying the current mode input signal directly. The exclusive OR function is the inverted current mode input signal. A novel method of using the PNP amplifier 33 and PNP inverter 34 in combination is employed wherein the PN emitter base diode of each element provides a low impedance path for removing minority carriers from the other element. The result is a simple, fast-acting current mode to voltage mode converter.

Binary trigger

Figure 7:
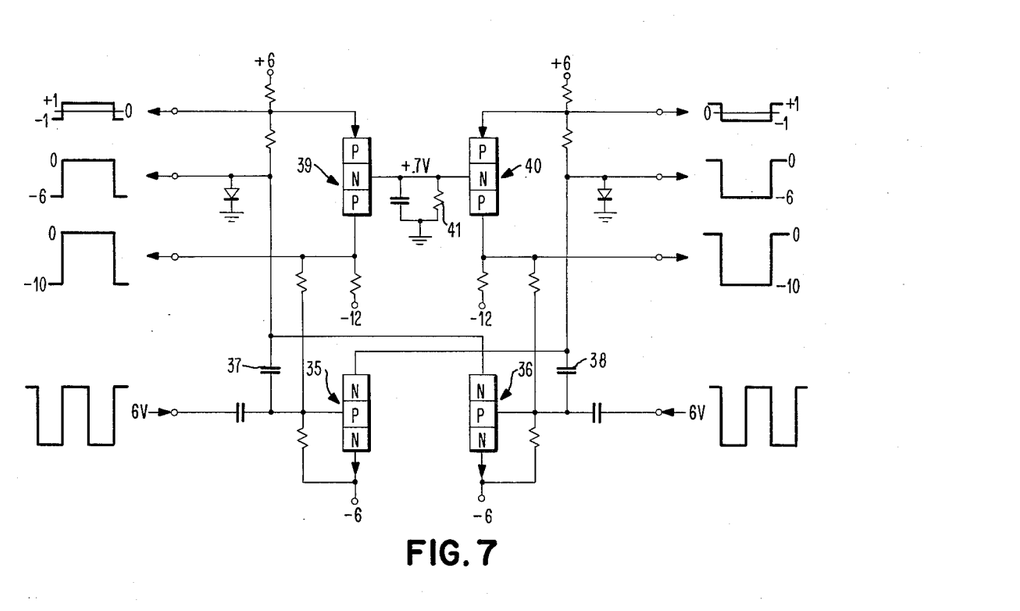
FIG. 7 is a diagram of a multimode binary trigger.

In FIG. 7 there is shown a binary trigger circuit consisting of two cross-coupled NPN inverters 35, 36. The high frequency feedback loop is through capacitors 37, 38 coupling the collector of one inverter to the base of the other. Logic mode outputs are obtained from paraphase voltage amplifiers 39, 40 that are driven from the current mode output of each inverter. Excessive loading of the current mode outputs is prevented by self-biasing the bases of the paraphase amplifiers with a common bypassed resistor 41 to ground. The logic mode outputs provide low frequency D.C. feedback paths to cross couple the NPN inverters. It will be noted that each side of the trigger has three outputs, a current mode, voltage mode and diode logic mode, each of these outputs operating upon the trigger itself to perform the function for which it is best suited.

Ring trigger

Figure 8:
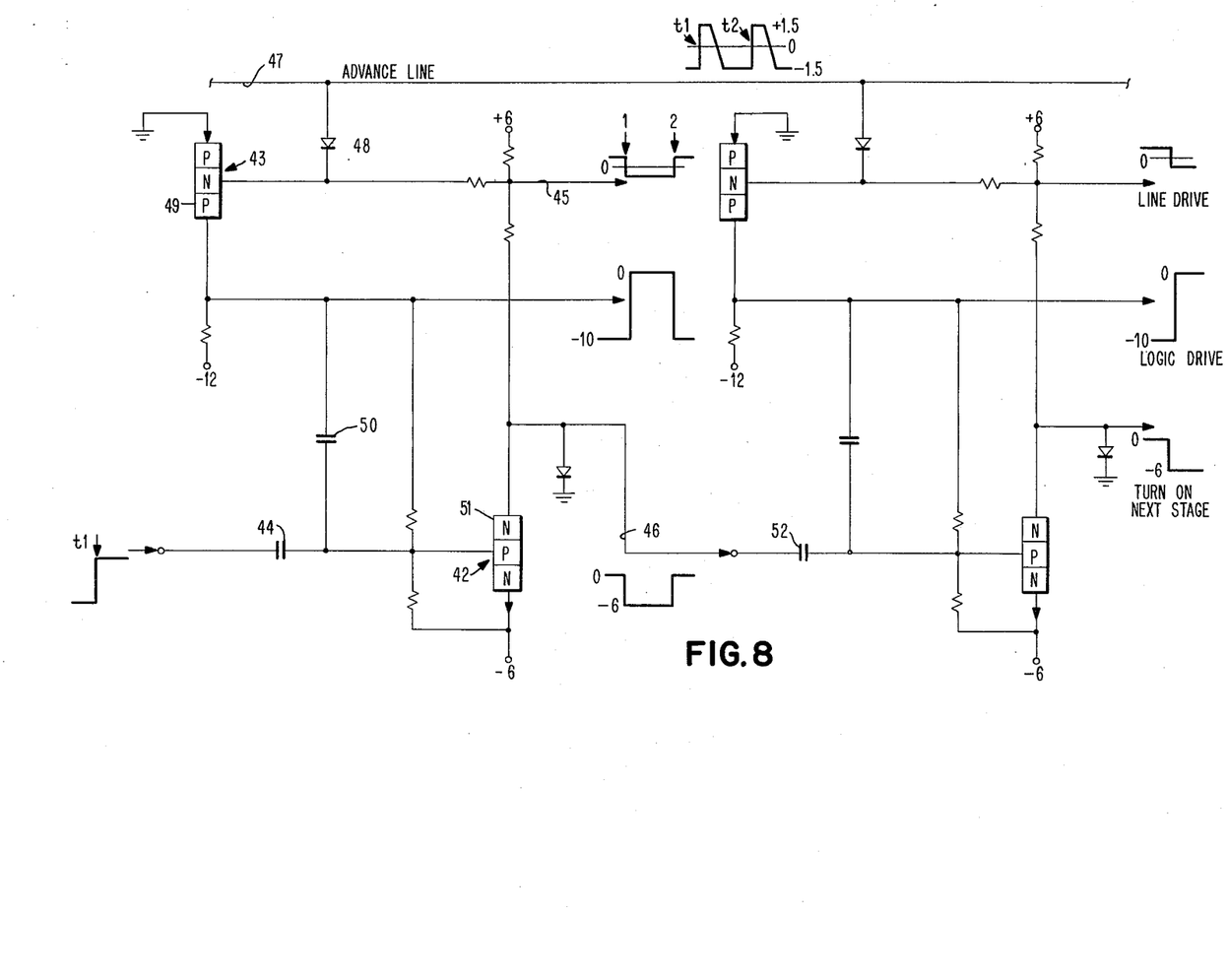
FIG. 8 is a diagram of a multimode two position ring trigger.

Although the binary trigger shown in FIG. 7 would operate satisfactorily as a ring trigger, a much simpler design is possible. In FIG. 8 there is shown two stages of a ring trigger wherein each trigger is composed of an NPN inverter 42 coupled to a PNP inverter 43. Both transistors of the trigger are normally cut off so that the standby power of the ring is very low. The first trigger turns on at time $t_1$ as a result of a positive transient upon its input capacitor 44 and negative outputs appear on the current mode and voltage mode output lines 45 and 46, respectively, as a result of the current flow in the conducting NPN. As the pulse on the advance line 47 terminates, the PNP inverter 43 is allowed to go into conduction and this locks up the trigger on its ON condition until the next advance pulse. The next advance pulse will drive through the coupling diode 48 and turn off the PNP inverter. The negttive transient at the collector 49 of the PNP inverter is coupled, through a capacitor 50, to the base of the NPN inverter and cuts the NPN inverter off. The resultant rise at the collector 51 of the NPN inverter is coupled, through capacitor 52, to the next stage to turn it on. Cutoff of the PNP inverter 43 in the first trigger is maintained by the up level of the current mode output on line 45.

It is again evident that each output performs the function for which it is best suited. The logic mode output is delayed slightly in turning on, by the advance pulse. The slight delay may prove beneficial in many instances by preventing overlapping outputs from the ring.

Multivibrator

Figure 9:
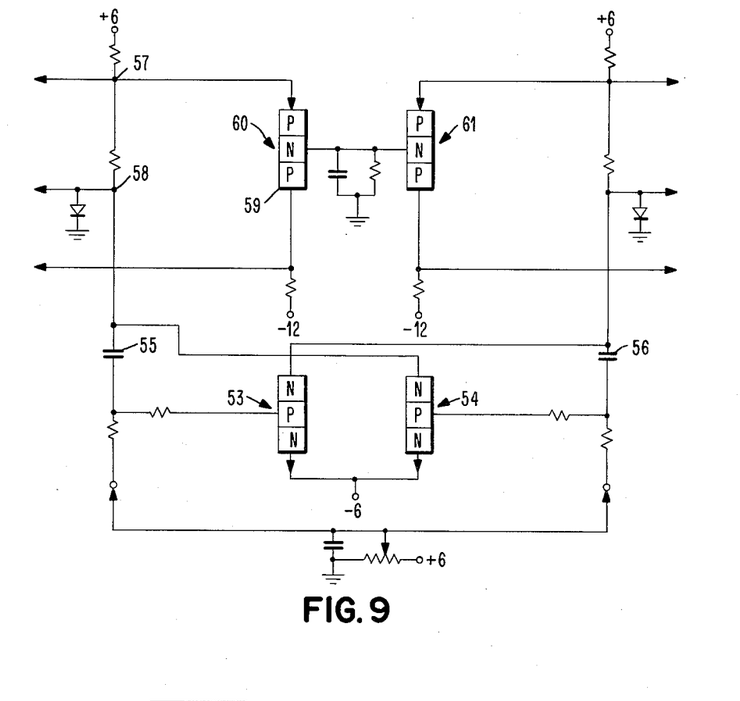
FIG. 9 is a diagram of a multimode multivibrator.

The multivibrator, shown in FIG. 9, consists of two NPN inverters 53, 54 normally biased to conduct. The cross-coupling capacitors 55, 56 provide the A.C. feedback loop that causes conduction to alternate from one inverter to the other and the frequency of this alternation is determined by the R–C time constants and the applied voltages. Current mode and voltage mode outputs are obtained from the NPN inverters at points 57 and 58, respectively.

Logic mode outputs appear at the collectors 59 of a pair of paraphase amplifiers 60 and 61. Since the logic mode outputs are not used by the multivibrator, it is possible to omit the PNP transistors if these outputs are not needed. The frequency of the multivibrator may be varied by potentiometer.

Single shot

Figure 11:
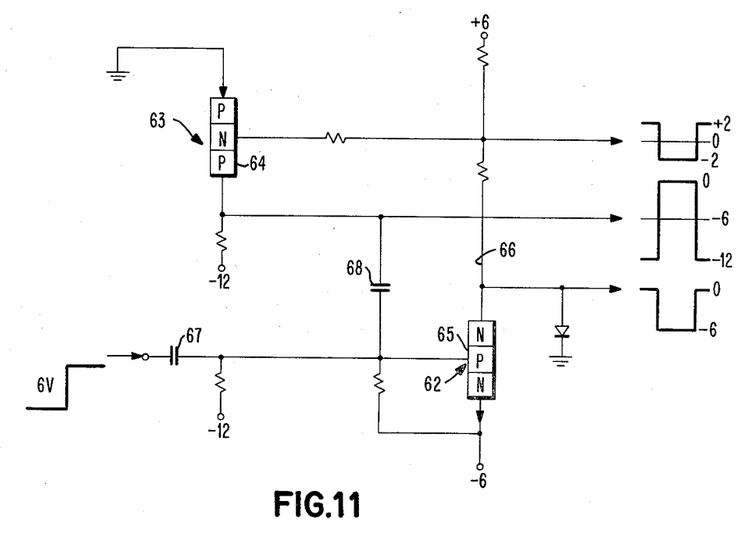
FIG. 11 is a diagram of a multimode single shot.

Referring to FIG. 11, a single shot is shown which is composed of an NPN inverter 62 coupled to a PNP inverter 63 as in the ring trigger. The D.C. feedback from the PNP collector 64 to the NPN base 65 is omitted. The NPN inverter 62 is normally cut off and its output on line 66 holds the PNP inverter 63 cut off. A positive-going input waveform is coupled by an input capacitor 67 to the base of the NPN inverter to turn it on. The current mode output from the NPN inverter turns on the PNP inverter and the positive transient at the collector 64 reinforces the original positive transient at the base of the NPN inverter through the coupling capacitor 68. After a short interval, the NPN inverter cuts off which, in turn, cuts off the PNP inverter and the feedback now operates to force the NPN base 65 well into cutoff completing the "single shot" operation.

Pulse stretcher

Figure 10:
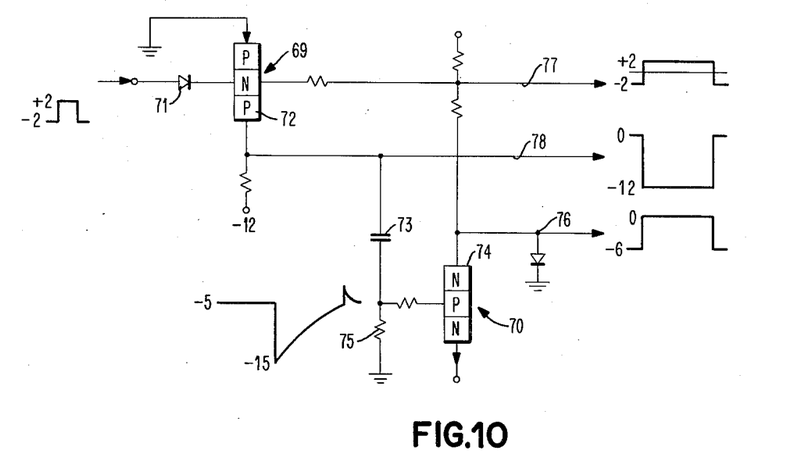
FIG. 10 is a diagram of a multimode pulse stretcher.

A pulse stretcher is shown in FIG. 10 which is similar to the single shot and the ring trigger except, in this case, both the PNP inverter 69 and the NPN inverter 70 are normally conducting. A short pulse entered through the input diode 71 to the base of the PNP inverter 69 will cut off this inverter and the negative drop at the collector 72 is coupled through a capacitor 73 to the base of the NPN inverter 70 to cut it off. The output at collector 74 of the NPN inverter will swing to its up level and remain there as long as the inverter is cut off. Both inverters will remain cut off while capacitor 73 discharges through the resistor 75 to ground. The time duration of the voltage mode output at 76 is a function of the R–C time constant of the circuit and may be varied by changing the capacitor 73. Current mode and diode logic mode outputs are available on lines 77 and 78, respectively, from the PNP inverter.

Shift register

Figure 13:
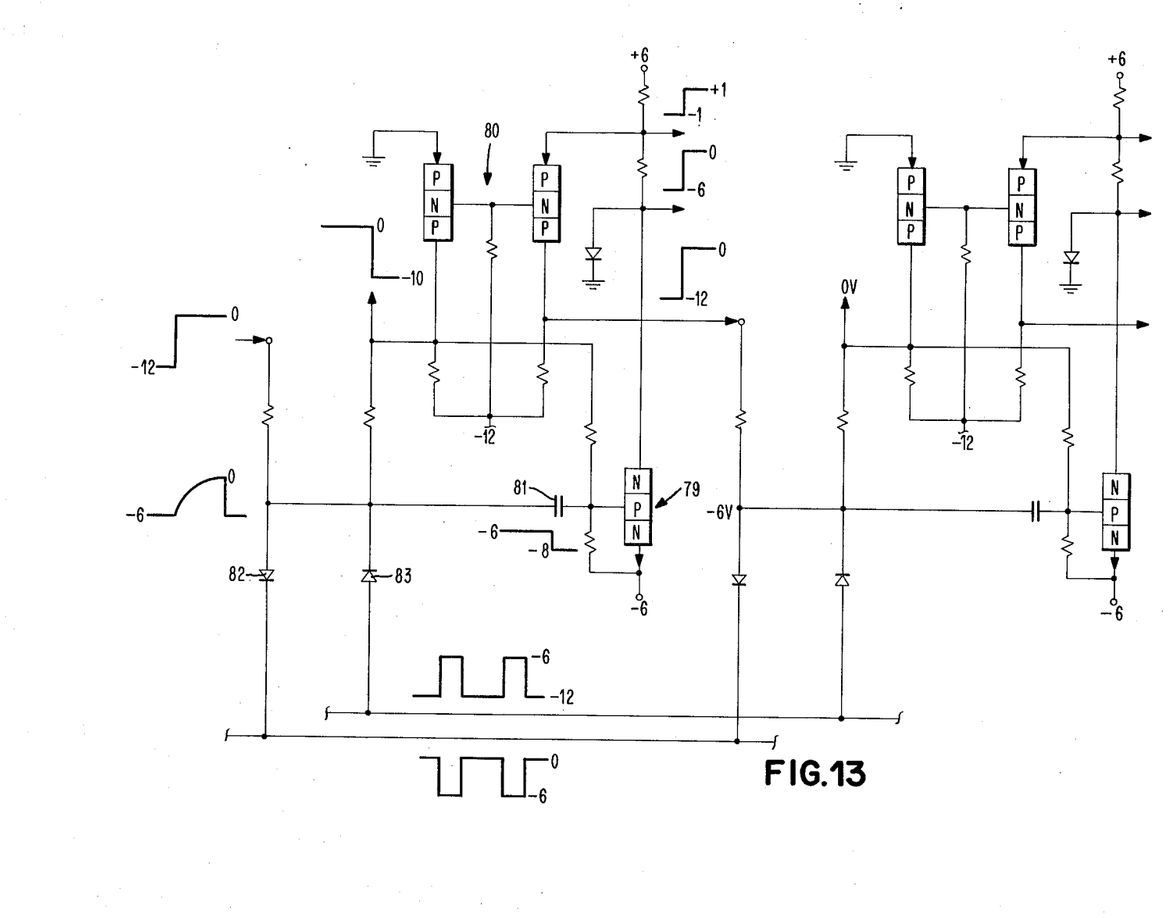
FIG. 13 is a diagram of a multimode shift register.

Referring to FIG. 13, there is shown a multi-mode shift register which is composed of an NPN inverter 79 coupled to a current mode-to-voltage mode converter 80 of the type shown and described in the exclusive OR circuit. In this circuit, a resistive feedback is used to form a latch with two stable states. A novel input gate is used to set the latch on or off as required. The input is compared with the present state of the latch and a "difference voltage" is developed if the input differs from the latch output.

This difference voltage charges the input capacitor 81 either positively or negatively. The succeeding sync pulse removes the capacitor charge and sets the register to the same state which existed before the sync pulse was applied. If now the input does not change, no difference in voltage will be developed in the next interval between pulses and no action will take place when the next sync pulse appears. It should be noted that if the input changes during the sync pulse, no change will be reflected into the base of the NPN inverter 79 since the other side of the input capacitor is clamped by the sync input diodes 82, 83 to negative 6 volts.

Following the sync pulse, any change in voltage resulting from an input change will be in a direction that urges the NPN inverter into the state it already has, as a result of the previous sync pulse. Thus, the latch is not required to discriminate against spurious transient conditions resulting in fast response and reliable operation.

*Shift register driver*

Figure 12:
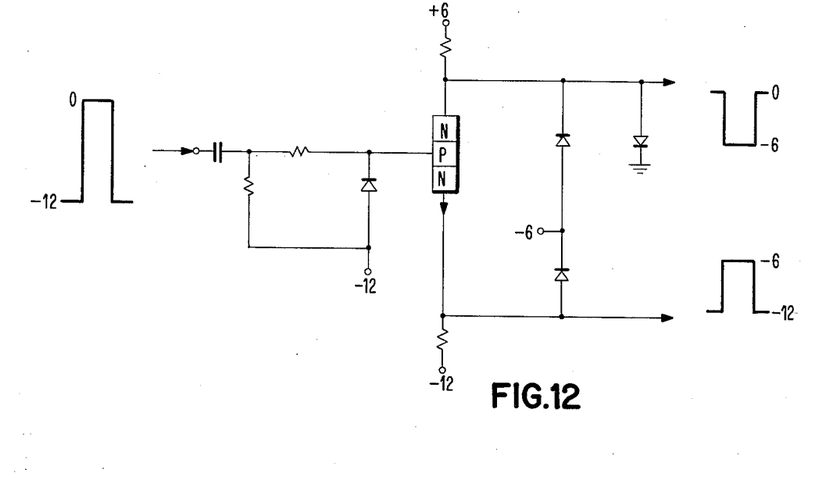
FIG. 12 is a diagram of a multimode shift register driver.

Referring to FIG. 12, there is shown a circuit which combines the NPN inverter and the NPN emitter follower functions by the use of a phase splitter. The input is a twelve volt logic mode output (from the single shot in FIG. 11, for example). Diode clamping is used on the input to reduce recovery time. The outputs of the phase splitter are limited to six volts to meet the requirements of the shift register gate.

*Full adder*

Figure 14:
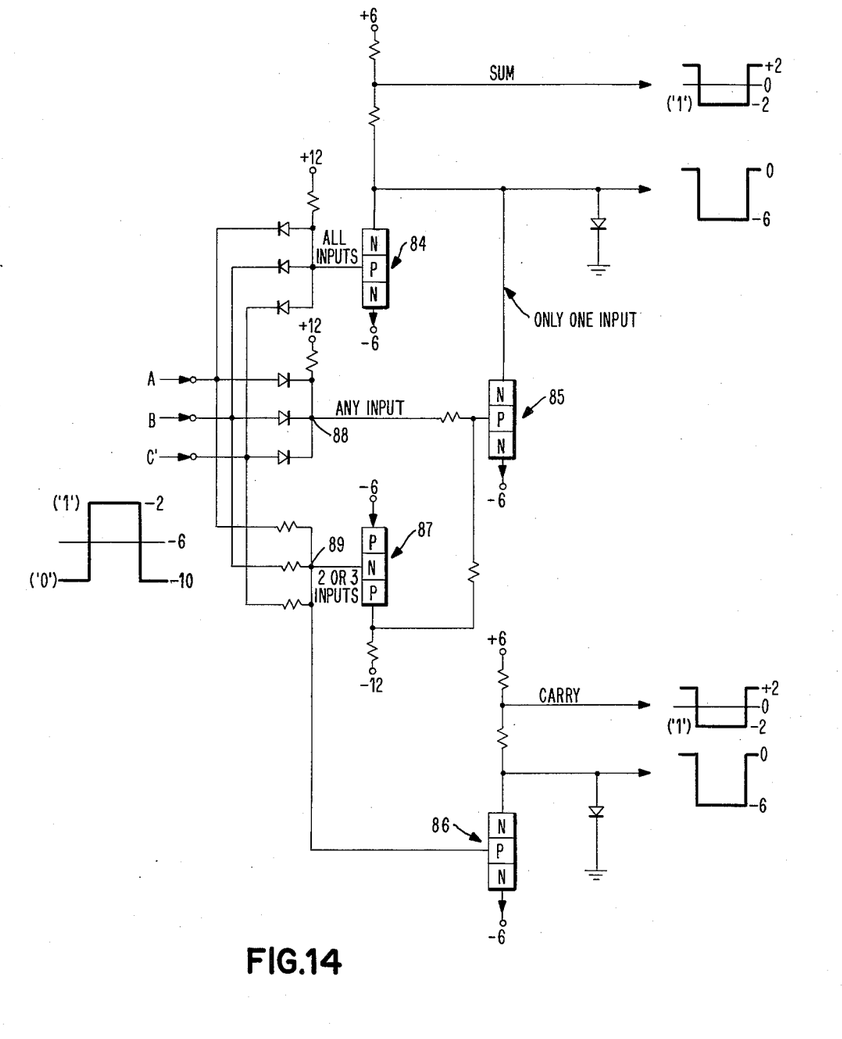
FIG. 14 is a diagram of a multimode full adder.

In FIG. 14 there is shown a full adder of the type wherein the sum is determined logically as "all ones" or "only one" from the three inputs. A carry results from "two or three" ones at the inputs. Logic mode pulses above a negative 6 volts represent a "1" and below negative 6 volts a "0" while the current mode representation is the inverse, i.e., current mode pulses above 0 volts represent a "0" and below 0 volts, a "1."

In the operation of the circuit, with all inputs below negative 6 volts, the NPN inverters 84, 85 and 86 are cut off and the PNP inverter 87 is in conduction. In this condition, both sum and carry outputs are at positive 2 volts (no load), each representing a "0." When a "1" appears at any input, and only one input, the NPN inverter 85, whose output is labeled ONLY ONE INPUT, conducts. Raising any input above negative 6 volts causes the output of the logical OR (ANY INPUT) to rise above negative 6 volts. The output of the resistor logical input network does not rise above negative 6 volts, however, because two inputs are below negative 6 volts and have control. The PNP inverter 87, therefore, is still conducting and the ONLY ONE INPUT inverter 85 may conduct to produce a SUM output. The NPN inverter 86 controlling the CARRY output is still cut off so there is no carry with only one input.

With two inputs above negative 6 volts and one input below negative 6 volts, the condition on the resistor input is such that the line labeled 2 OR 3 INPUTS is raised above negative 6 volts. This cuts off the PNP inverter 87 and the voltage at the collector drops which cuts off the ONLY ONE INPUT NPN inverter 85, even though the diode OR circuit is effective to raise the ANY ONE INPUT junction 88. The output of the diode AND circuit (all 1's) is still below negative 6 volts so that the SUM output in 0. The carry output is now at negative 2 volts to represent a 1 because the junction 89, 2 OR 3 INPUTS, is above negative 6 volts.

When three inputs are above negative 6 volts, the output of the positive AND (all 1's) rises above negative 6 volts and the NPN inverter 84 conducts and produces a SUM output. The CARRY output is also effective for three inputs. Thus, with rather simple circuitry, the requirements of an adder truth table may be fully met. Although this circuit does not produce logic mode outputs, these may be produced from the current mode output, as required.

*Conclusions*

(1) It is possible to utilize simple basic circuit configurations for all logical functions and for the many special devices used in any digital computer by the multimode approach to transistor circuit design.

(2) In the multimode approach, problem areas associated with the single mode approach are avoided since the mode may be chosen to suit the particular function to be accomplished.

(3) Noise problems are minimized by:
  (a) greatly increasing the signal swing around the negative 6 volt reference.
  (b) eliminating the conventional bypassed input divider.
  (c) providing for greater tolerance on supply voltage.

(4) The danger of catastrophic failure of components is greatly reduced by:
  (a) elimination of high voltage supplies with clamp voltages.
  (b) elimination of the need for power drivers to drive long lines in the voltage mode.
  (c) elimination of cascaded logic with the resultant need for high current drivers.
  (d) referring all signals on lines to ground and protecting drivers to prevent damage from short circuits.

(5) Marginal checking may be more easily accomplished and gives more useful results by reserving a definite function for each supply voltage and using the fewest possible voltages.

(6) Economics are effected by using diodes for logical operations instead of transistors, by using simple circuits with standard components, by low power consumption, and by avoiding the need for special circuits.

(7) Performance is high with simple inverters by allowing a controlled saturation to reduce power dissipation and by providing low impedance paths for removing minority carriers.

(8) Serving is facilitated by the use of positive logic with large swings around a definite reference voltage. The current mode is always referred to ground reference and is easily recognized.

While there have been shown and described and pointed out the fundamental novel features of the invention as applied to a preferred embodiment, it will be understood that various omissions and substitutions and changes in the form and details of the device illustrated and in its operation my be made by those skilled in the art, without departing from the spirit of the invention. It is the intention, therefore, to be limied only as indicated by the scope of the following claims.

What is claimed is:

1. A switching network arranged in cascaded stages for the implementation of logical operations comprising
   a plurality of logical building blocks including at least one block of each of two different types, each responsive to bivalued signals for operation in an ON-OFF mode;
   each stage including at least one of said logical building blocks, the logical building blocks of succeeding stages being alternately one and the other of said different types;
   one of said two types of logical building blocks including
   an NPN transistor having base, emitter and collector electrodes,
   a logical AND circuit including a plurality of input diodes with their anodes connected to the base electrode, and
   means applying positive and negative operating potentials of substantially equal values to the collector and emitter electrodes respectively;
   the other type of logical building block including a PNP transistor having base, emitter and collector electrodes, a logical AND circuit including a plurality of input diodes with their cathodes connected to the base electrode of the latter transistor, and means applying ground potential and a negative operating potential of a value substantially larger than that of the first-mentioned negative operating potential to the emitter and collector electrodes of the latter transistor respectively;

one of the input diodes of one stage being connected to the collector electrode of the transistor of the preceding stage.

2. The switching network of claim 1 wherein one of the stages includes a plurality of logical building blocks of the same type, the collector electrodes of said plurality of logical building blocks being connected directly to each other to perform a logical OR function.

3. The switching network of claim 1 together with an output line characterized by relative high capacitance, said means for applying an operating potential to the collector electrode of one of said transistors including a voltage divider having an intermediate tap connected to said output line for supplying bivalued signals having a relatively low voltage excursion to said output line.

4. A switching network arranged in cascaded stages for the implementation of logical operations comprising a plurality of logical building blocks including at least one block of each of two different types, each responsive to bivalued signals for operation in an ON-OFF mode;

each stage including at least one of said logical building blocks, the logical building blocks of succeeding stages being alternately one and the other of said different types;

one of said two types of logical building blocks including a transistor of one conductivity type having base, emitter and collector electrodes.

a logical AND circuit including a plurality of input diodes with the base electrode connected to the diode electrodes of the same conductivity type as the base electrode, and means applying reverse bias and forward bias operating potentials of similar value to the collector and emitter electrodes respectively;

the other type of logical building block including a transistor of the opposite conductivity type having base, emitter and collector electrodes, a logical AND circuit including a plurality of input diodes with the base electrode connected to the diode electrodes of the same conductivity type as the base electrode, and means applying ground potential and a reverse bias operating potential of a value substantially larger than that of the first-mentioned operating potentials to the emitter and collector electrodes of the latter transistor respectively;

one of the input diodes of one stage being connected to the collector electrode of the transistor of the preceding stage.

5. The switching network of claim 4 wherein one of the stages includes a plurality of logical building blocks of the same type, the collector electrodes of said plurality of logical building blocks being connected directly to each other to perform a logical OR function.

6. The switching network of claim 4 together with an output line characterized by relatively high capacitance, said means for applying an operating potential to the collector electrode of one of said transistors including a voltage divider having an intermediate tap connected to said output line for supplying bivalued signals having a relatively low voltage excursion to said output line.

7. The switching network of claim 6 together with a common emitter amplifier having its base electrode coupled to the output line for producing at its output bivalued signals having a relatively high voltage excursion in response to the relatively low voltage signals.

8. The switching network of claim 6 together with a common base amplifier having its emitter electrode coupled to the output line for producing at its output bivalued signals having a relatively high voltage excursion in response to the relatively low voltage signals.

9. The switching network of claim 6 together with a source of reference potential having a value intermediate the low voltage excursions on said output line, additional first and second transistors of the same conductivity type, each having base, emitter and collector electrodes, means operating said additional first transistor as a common base amplifier, means for connecting the emitter of said additional second transistor to said source of reference potential and for operating said additional second transistor as a common emitter amplifier, the base electrodes of said additional transistors being connected to each other and the emitter electrode of said additional first transistor being coupled to said output line to produce at the collector electrodes out-of-phase bivalued signals.

References Cited by the Examiner

UNITED STATES PATENTS

| 2,557,729 | 6/1951 | Eckert | 307—88.5 |
|---|---|---|---|
| 2,853,632 | 9/1958 | Gray. | |
| 2,892,044 | 6/1959 | Fairstein | 328—171 X |
| 2,994,065 | 7/1961 | Thomas et al. | 340—172.5 |
| 3,058,007 | 10/1962 | Lynch | 307—88.5 |

FOREIGN PATENTS 1,156,517  5/1958  France.

OTHER REFERENCES

Cavalieri: "What's Inside Transac?" July 1, 1956, Electronic Design, vol. 4, No. 13, pp. 22–25.

Prom et al.: "Junction Transistor Switching Circuits for High Speed Digital Computer Applications," published Feb. 23, 1956, by Sylvania Electric Product Co., Waltham, Mass.

Richards: "Digital Computer Components and Circuits," Van Nostrand, 1957.

ARTHUR GAUSS, *Primary Examiner.*